May 21, 1957  C. E. MEYERHOEFER  2,793,055
TELESCOPIC COUPLING WITH CAM LATCH MEANS
Filed Aug. 2, 1952
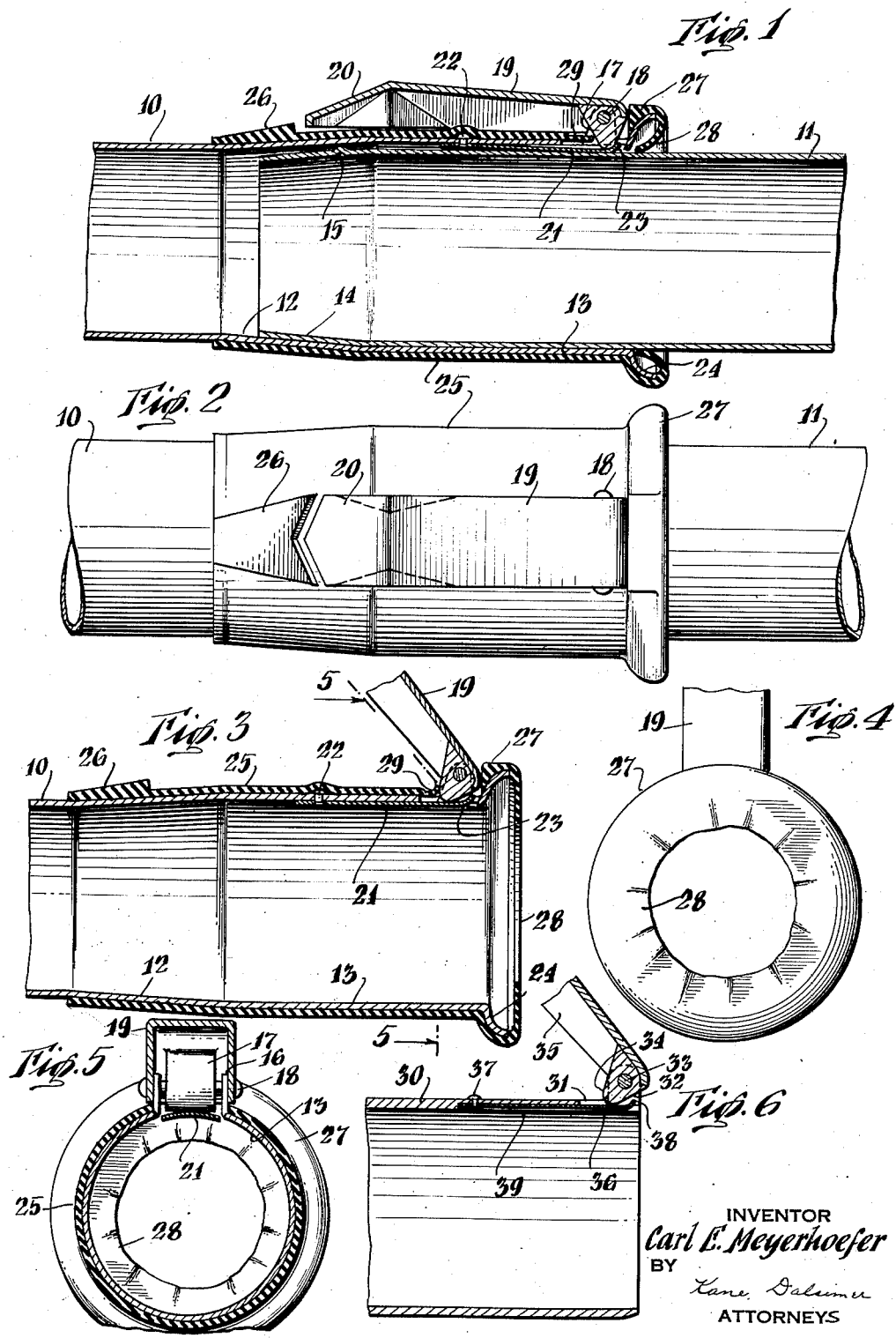
INVENTOR
Carl E. Meyerhoefer
BY
Kane, Dalsimer
ATTORNEYS United States Patent Office 2,793,055
Patented May 21, 1957

2,793,055

TELESCOPIC COUPLING WITH CAM LATCH MEANS

Carl E. Meyerhoefer, Brooklyn, N. Y., assignor, by mesne assignments, to Lewyt Corporation, Brooklyn, N. Y., a corporation of New York Application August 2, 1952, Serial No. 302,327

5 Claims. (Cl. 285—7)

This invention relates to a structurally and functionally improved coupling especially intended for use as part of a vacuum cleaner assembly and specifically in association with the wand sections or accessory tools of that assembly. This application is a continuation-in-part of my prior application on Wand Coupling, Serial No. 93,875, filed May 18, 1949, now abandoned.

By means of the present invention a coupling is provided the parts of which may readily be connected or separated from each other and when connected will remain against all probability of accidental movements with respect to each other in assembled condition.

A further object is that of providing a structure of this type which will furnish a coupling in which air leakage will be reduced to a minimum to assure a maximum effectiveness on the part of the vacuum cleaner assembly.

Another object is that of furnishing a coupling in which the parts when connected present smooth uninterrupted internal wall surfaces without openings or obstructions to catch dirt.

Still another object is that of furnishing a structure which will include relatively few components, each relatively rugged in design and capable of ready manufacture at nominal cost.

With these and other objects in mind, reference is had to the attached sheet of drawings illustrating practical embodiments of the invention and in which:

Fig. 1 is a fragmentary sectional side view of a coupling;

Fig. 2 is a plan view thereof;

Fig. 3 is a view similar to Fig. 1 but showing merely a single wand section and the coupling structure in association therewith;

Fig. 4 is an end view of the structure as illustrated in Fig. 3;

Fig. 5 is a transverse sectional view taken along the line 5—5 and in the direction of the arrows as indicated in Fig. 3; and Fig. 6 is a view similar to Fig. 3 but showing an alternative form of construction.

Referring primarily to Fig. 1 in which a pair of wand sections have been illustrated at 10 and 11, the numeral 12 indicates a preferably flared area adjacent the tubular end of part 10. Beyond this point and extending through to the end of that section is a preferably cylindrical portion 13. Section 11 to be coupled with section 10 has adjacent its end a tapered area 14 the angularity of which corresponds substantially to that of area 12 of section 10. Within the tapered area 14 a protuberance 15 may be struck outwardly from the face of section 11. For purposes of illustration, the clearance which exists between protuberance 15 and the inner face of flared section 12 has been somewhat exaggerated. As will be understood, it is desirable to provide such a protuberance or projection for cooperation, as a detent, with the sockets or receiving portions of certain tools or accessories which may form a part of the complete kit or assembly. This, of course, will be the case where the latter units do not terminate in a portion similar to section 10.

Adjacent its outer end section 10 is provided with a pair of upstanding ears 16 to each side of an opening through the wall of this section. Between these a cam element 17 is pivotally supported by for example a pin 18 spaces existing to each side of the cam to accommodate the ears 16. A handle or actuating portion 19 preferably U-shaped in section is rigidly connected to cam 17 and conveniently terminates in a portion 20 inclined towards the axis of the section when the handle lies adjacent the outer surface of the same. It is to be noted that in such position the cam portion of element 17 extends forwardly of pivot 18. Therefore, with pressure exerted against the parts there will be no tendency of the cam to shift around its pivot to a position where it is retracted from within the opening existing between the ears 16. Also, as will be seen in that position, the cam portion projects into the plane of the inner face of cylindrical portion 13 or slightly beyond that plane.

As will be appreciated, sections 10 and 11 are ordinarily to be formed of a metal which is not especially hard. Therefore, if the cam were repeatedly brought into engagement with the surface of section 11, it would indent the same to an extent such that the efficiency of the coupling would be impaired after a certain length of time. In order to overcome this, a transversely curved strip 21 of spring material is secured as at 22 to lie adjacent the inner face of cylindrical portion 13 of section 10. This strip or spring has a length such that it extends to a point beyond cam 17. At that point, it is preferably curved upwardly as at 23. Therefore, it is apparent that as the cam is swung by means of its actuator the free outer end of the strip will be flexed toward the axis of section 10. It follows that a bearing surface of substantial area will be provided for engagement with the outer face of a section such as 11. Accordingly, an indenting of the surface of the latter section will be prevented. At the same time, a firm frictional engagement between spring strip 21 and section 11 will occur throughout an effective area such that a separation of that section from the section 10 will be prevented. As is apparent, strip 21 substantially obstructs the opening and need not necessarily include a free outer end as long as it incorporates adequate resiliency. Embracing this factor, the strip serves the additional purpose of engaging with the surfaces of cam 17 to either retain the same in the position shown in Fig. 1 or in that shown in Fig. 3 so that an operator having once shifted the parts, will not find that they have accidentally returned to an initial position.

With a view to providing an anchoring portion for a sealing sleeve structure, section 10 at its outer end is provided with a radially and outwardly extending flange portion 24. A sleeve 25 is provided comprising a body formed of a material such as rubber; the diameter of the sleeve being such that it will fit under tension around the portions 12 and 13 of section 10. This sleeve preferably has a thickened portion 26 adjacent its inner end to lie at a point beyond the end portion 20 of handle 19. The thickened portion serves as a guard when the parts are in the positions shown in Figs. 1, 2 and 5. The opposite end of the sleeve terminates in an enlarged portion 27 encircling flange 24 and an inwardly extending flexible and resilient skirt or lip portion 28 which defines an opening having a diameter substantially less than the overall diameter of section 11. An opening is provided in the sleeve adjacent the cam element 17 and through which the later may extend. The width of that opening is—as shown in Fig. 5—just adequate to accommodate the spaced legs 16. At one end, it is defined by portion 27 of the sleeve which rides against the outer face of the cam element and handle when the parts are in the position shown in Fig. 1 to thus provide a substantially airtight seal at that point. A lip portion 29 forming a part of the sleeve extends in wiping contacting with the inner face of the cam element to provide a seal at this point. Therefore, an inflow of air through the opening of the sleeve is prevented to a maximum extent.

With a structure such as that described, it will be understood that if it is desired to connect sections 10 and 11 handle 19 will primarily be swung to the position shown in Fig. 3. Thereupon, the reduced end portion 14 of section 11 is introduced into the cylindrical portion 13 of section 10 by passing through the opening defined by lip 28. This introduction is preferably accompanied by relative axial rotation of sections 10 and 11. The projection of section 11 is continued until its tapered portion 14 bears in firm contact against the flared portion 12 of section 10. Thereupon, handle 19 is swung downwardly to the position shown in Fig. 1. Under those circumstances, cam 17 presses against strip 21, as shown in Fig. 5, to flex that strip into contact with the outer face of section 11. Under these circumstances a friction lock is provided which prevents accidental separation of the parts. As aforedescribed, leakage will not occur to any objectionable extent through the opening of the sleeve into which cam element 17 extends. Due to the reduced diameter of the inner edge of skirt portion 28, that part will wipingly engage with the outer surface of section 11 as it is introduced into section 10. Therefore in the manner shown in Fig. 1 a sealing lip or portion is provided in effect completely closing any spaces which exist between the outer end of section 10 and the outer face of section 11. Accordingly, leakage at this zone is also prevented.

While the invention has been illustrated in connection with tubular wand sections, it will be understood that it might be applied to tools or accessories forming a part of the vacuum cleaner assembly, and the illustration in Fig. 6 may be regarded as showing such a coupling. Also as shown in that view the sleeve 25 may be eliminated. However it is preferred ordinarily to reduce leakages to a minimum by employing the sleeve or equivalent structure.

Accordingly, in this view the numeral 30 indicates a tubular portion either forming a part of a wand or a tool. That portion adjacent its end is provided with an opening 31 adjacent which spaced ears 32 extend upwardly or outwardly. A pivot 33 mounted by these ears rockingly supports a cam element 34. A handle 35 is affixed to this element and corresponds to the handle 19. A spring strip 36 is mounted by section 30 as at 37 and preferably has an upturned end portion 38. The inner face of section 30 is grooved or recessed as indicated at 39 to accommodate strip 36. Therefore, with the handle 35 in raised position, that strip will occupy a position within the area defined by the inner face of section 30 and will preferably be transversely curved in a manner similar to that shown in Fig. 5. However, when handle 35 is swung to a position at which it lies parallel to the axis of section 30, strip 36 will be flexed inwardly to frictionally engage with the outer face of an adjacent wand or tool section.

Thus, among others, the several objects of the invention as specifically aforenoted are achieved. Obviously numerous changes in construction and rearrangement of the parts might be resorted to without departing from the spirit of the invention as defined by the claims.

I claim:

1. A vacuum cleaner wand coupling including in combination a pair of tubular sections having adjacent ends disposable in telescopic relationship, said sections each including walls of a thickness and material such that they are flexible under pressure, the body of the outermost section being enlarged throughout the area receiving the innermost section, an inwardly extending part included within the outermost section and defining a surface engaged by the end edge of the innermost section when the latter is fully projected into the bore of the outermost section to provide an inner zone of support between said sections, the outermost section being formed with an opening through its wall, a cam mounted for rotation by said outermost section adjacent said opening for movement in a direction parallel to the axis of such section and extendable through the latter to a point beyond the position into which the outer face of the innermost section normally extends, means for rotating said cam to cause its periphery to act against the innermost section and flex zones of both the latter and the outermost section in opposite directions whereby they yieldingly resist cam movement and to also force the innermost section into firm bearing engagement with the inner face of the outermost section at a point diametrically opposite said cam to provide an outer zone of support between said sections such that they will be rigidly mounted one by the other, and a strip interposed between said cam and the outer face of the innermost section; said strip obstructing said opening.

2. A vacuum cleaner coupling as specified in claim 1, said strip having a movable end, means for mounting the opposite end of said strip on the inner face of said outermost section at a point remote from the end of the latter and with its movable end extending in the direction of the end of such section.

3. A vacuum cleaner wand coupling as specified in claim 1, a sleeve of air-impervious material enclosing the end zone of said outermost section, a handle operatively connected to said cam and mounted by said section to extend axially thereof at a point exteriorly of said sleeve and a part of said sleeve wipingly engaging the face of said cam to prevent the entrance of air past the surface of such cam face and through the opening of the outermost section.

4. A vacuum cleaner coupling as specified in claim 1, a sleeve of air-impervious material mounted by said outermost section adjacent its end to enclose the latter, a flexible skirt forming a part of said sleeve, overlapping said end and defining an opening of smaller diameter than the diameter of the innermost section and the edge of said skirt wipingly engaging the outer face of said innermost section in sealing relationship with the same as said innermost section is disposed in telescopic relationship with respect to said outermost section.

5. A vacuum cleaner wand coupling as specified in claim 1, said means for rotating said cam comprising a handle secured to the latter and extending axially of said sections when said cam is fully projected, a sleeve enclosing the end zone of said outermost section and interposed between said handle and the outer face of such section, and a thickened portion forming a part of said sleeve to lie adjacent the end of said handle when the latter extends axially of the sections.

References Cited in the file of this patent

UNITED STATES PATENTS

| | | |
|---|---|---|
| 945,106 | Moodey | Jan. 4, 1910 |
| 1,174,288 | Rosenfeld | Mar. 7, 1916 |
| 1,519,095 | Kraft | Dec. 9, 1924 |
| 2,033,142 | Lewis | Mar. 10, 1936 |
| 2,245,151 | Martinet | June 10, 1941 |
| 2,451,791 | Weaver | Oct. 19, 1948 |
| 2,457,908 | Meyerhoefer | Jan. 4, 1949 |
| 2,490,363 | Lang | Dec. 6, 1949 |
| 2,523,770 | Marette | Sept. 26, 1950 |

FOREIGN PATENTS

| | | |
|---|---|---|
| 643,472 | Germany | Apr. 8, 1937 |
| 169,257 | Great Britain | Sept. 21, 1921 |
| 508,735 | Great Britain | July 5, 1939 |